United States Patent [19]
Kasamatsu et al.

[11] Patent Number: 5,991,118
[45] Date of Patent: Nov. 23, 1999

[54] SLIDER FOR MAGNETIC HEAD AND MAGNETIC MEMORY APPARATUS

[75] Inventors: Yoshiharu Kasamatsu; Takahiro Imamura, both of Kanagawa, Japan

[73] Assignee: Fujitsu Limited, Kawasaki, Japan

[21] Appl. No.: 08/782,737

[22] Filed: Jan. 13, 1997

[30] Foreign Application Priority Data

Mar. 5, 1996 [JP] Japan ..................................... 8-047023

[51] Int. Cl.$^6$ ....................................................... G11B 5/60
[52] U.S. Cl. .............................................................. 360/103
[58] Field of Search .................................... 360/103–104

[56] References Cited

U.S. PATENT DOCUMENTS 5,323,282  6/1994  Kanai et al. ............................ 360/103

FOREIGN PATENT DOCUMENTS

| | | |
|---|---|---|
| 56-107363 | 8/1981 | Japan ...................................... 360/103 |
| 61-151827 | 7/1986 | Japan . |
| 63-37874 | 2/1988 | Japan . |
| 3228274 | 10/1991 | Japan . |
| 428070 | 1/1992 | Japan . |
| 4-32080 | 2/1992 | Japan ...................................... 360/103 |
| 5-89626 | 4/1993 | Japan ...................................... 360/103 |
| 594683 | 4/1993 | Japan . |
| 5282646 | 10/1993 | Japan . |

*Primary Examiner*—Allen T. Cao
*Attorney, Agent, or Firm*—Greer, Burns & Crain, Ltd.

[57] ABSTRACT

A magnetic head which can fly over a surface of a magnetic recording medium comprises a main body fitted into a supporting arm, rail surfaces formed in the main body to serve pneumatic bearings, and projections formed on the rail surfaces and having surfaces opposing a magnetic recording medium. The projections have larger surface roughness than that of the magnetic recording medium, whereby wear-out rate of the projections provided on the magnetic head can be reduced and also the projections can be firmly brought into contact with the surface of the magnetic recording medium.

21 Claims, 10 Drawing Sheets

Fig. 4
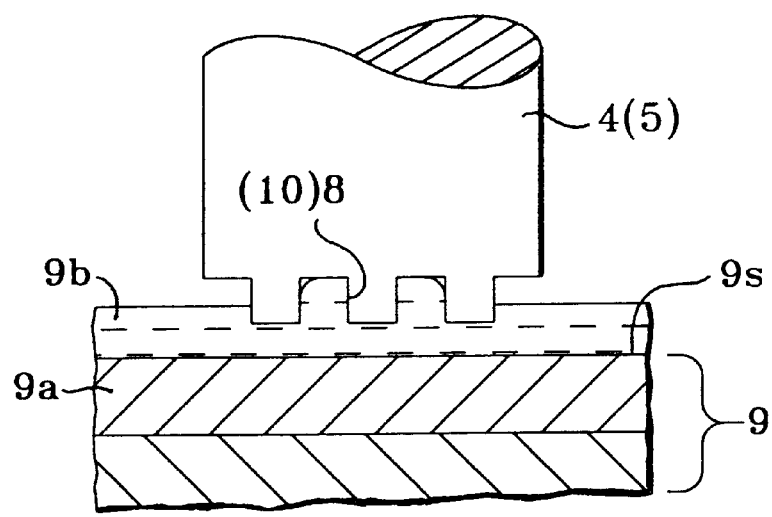
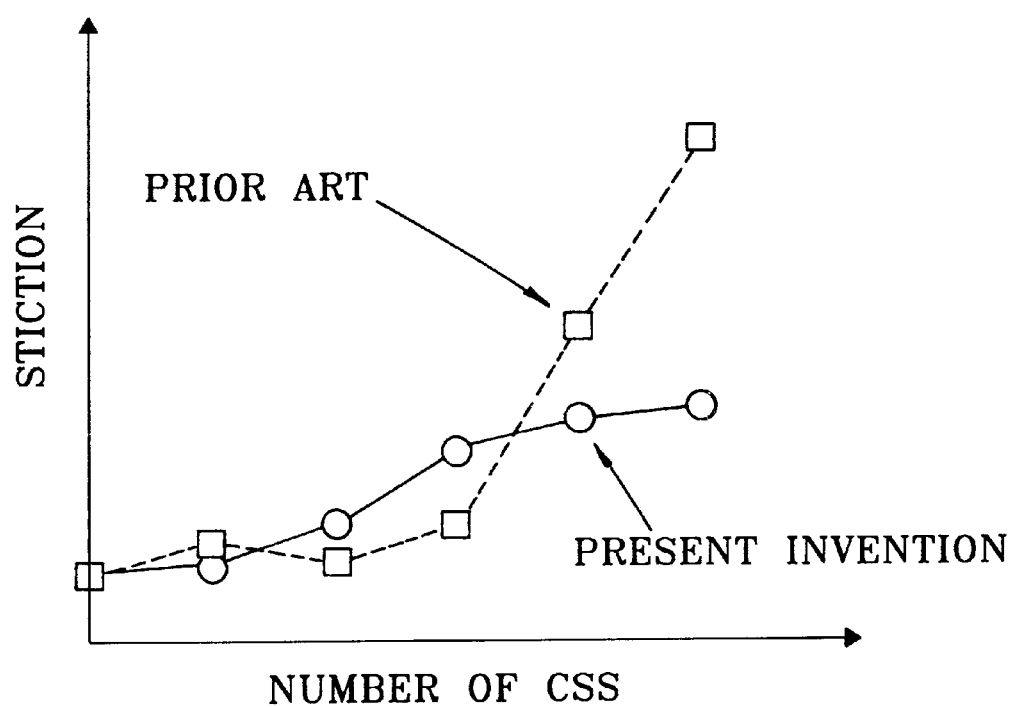
Fig. 5

SLIDER FOR MAGNETIC HEAD AND MAGNETIC MEMORY APPARATUS

BACKGROUND OF THE INVENTION

1. Field of the Invention

The present invention relates to a slider for a magnetic head and a magnetic recording drive and, more particularly, to a slider for a magnetic head which is able to fly over a surface of a magnetic recording medium and to a magnetic recording drives equipped with the slider for magnetic head.

2. Description of the Prior Art

In the magnetic disk drive, a CSS (contact start and stop) scheme in which the slider for magnetic head starts in contact with the magnetic disk and again comes into contact with the magnetic disk at the time of stop has often been adopted.

In the magnetic head flying type magnetic disk drive, higher recording density has been intended to promote miniaturization.

Accordingly, a flying height of the magnetic head (electromagnetic transducer) from the magnetic disk, i.e., a spacing is prone to be reduced. If the flying height is lessened, there is necessity of preventing contact between the magnetic disk and the magnetic head by reducing surface roughness of the magnetic disk.

The slider for magnetic head employing the CSS scheme comes into contact with the magnetic disk when it is stopped while it flies over the surface of the magnetic disk because of operation of air flow caused by the rotation of the magnetic disk, i.e., based on the principle of dynamic kinetic air pressure bearing by fluid lubrication.

In the magnetic disk drive employing the CSS scheme, as unevennesses of the surface of the magnetic disk are reduced to thus lower surface roughness, the slider in the flying state does not come into contact with the surface of the magnetic disk.

However, if the surface roughness is lowered, contact areas between the slider and the magnetic disk are enhanced when the magnetic disk is in the stop state, potentially be causing the slider and the magnetic disk to stick to each other.

If the slider and the magnetic disk are stuck tightly together, a suspension for supporting the slider could be destroyed upon staring rotation of the magnetic disk. Hence, it becomes difficult for the slider to fly over the magnetic disk normally.

In order to reduce such problem, it has been set forth in Patent Application Publications (KOKAIS) 63-37874 and 4-28070, for example, to reduce contact areas between the magnetic disk and the slider by providing a plurality of projections on kinetic air pressure bearing surfaces (rail surfaces) of the slider for the magnetic head opposing to the magnetic disk.

Diameter of the projections of the slider must be lessened to reduce the contact areas between the slider and the magnetic disk as flatness of the surface of the magnetic disk is improved.

However, if diameters of the projections are lessened, pressure applied to a unit area of the projection becomes high. In addition, a situation could readily occur in which a part of plural projections do not come into contact with the surface of the magnetic disk, because of deviation of a center of gravity in the stopped state of the slider causing the rail surfaces to twist.

As a result, since pressure applied to a part of the projections is increased higher than a design value in the stopped state projections are quickly worn-out, and the durability of the magnetic head is decreased.

Still further, although the height of the projections must be selected to a height not to affect the fly of the slider, e.g., be lowered to about 30 nm, the height is selected on the substantially in the same order as a finished crowning amount of the rail surfaces of the slider.

In this case, since rail surfaces positioned at locations other than the projections come into contact with the magnetic disk, the meaning of the projections provided to prevent such stick is lost.

SUMMARY OF THE INVENTION

An object of the present invention is to provide a magnetic head allowing wear-out rate of the projections provided on the magnetic to be reduced and also allowing the projections to be firmly brought into contact with the surface of the magnetic recording medium, and a magnetic recording drives equipped with such magnetic head.

According to an aspect of the present invention, surface roughness or difference in uneven height of the projections formed on the magnetic recording medium opposing surface of the slider for magnetic head is formed larger than surface roughness of the magnetic recording medium. The unevenness is formed by forming groove, holes, or second projections into the top surfaces of the projections, for example.

Hence, even if occupied areas of the projection forming regions on the rail surfaces are widened, real contact areas between the projections and the magnetic recording medium are not widened correspondingly. As a result, the tendency between the projection and the magnetic recording medium to stick to each other can also be suppressed. Furthermore, according to increase in projection forming region, probability to bring all projections into contact with the magnetic recording medium can be increased.

According to another aspect of the present invention, in case the magnetic recording medium opposing surface of the slider for magnetic head is flat or slightly curved toward the outside, the locations of the projections formed on the rail surfaces are formed near the center of the magnetic recording medium opposing surface rather than the center of the rail surfaces.

As a result, under the condition that the magnetic head is mounted on the magnetic recording medium, contact of the slider main body of the magnetic head to the magnetic recording medium can be avoided so that contact between the magnetic recording medium and the projections can be firmly made.

Additional objects and advantages of the present invention will be set forth in the description which follows and in part will be obvious from the description or may be learned by practice of the present invention. The objects and advantages of the present invention may by realized and obtained be means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiments of the present invention, and together with the general description given above and the detailed description of the preferred embodiment given below, serve to explain the principles of the present invention.

FIG. 4 is a sectional view showing contact state between the slider according to the second embodiment of the present invention and a magnetic disk;

FIG. 5 is a characteristic diagram illustrating variation in stiction between the slider and the magnetic recording medium with respect to the number of CSS of the magnetic head having the slider according to the second embodiment of the present invention;

DESCRIPTION OF THE PREFERRED EMBODIMENTS

Therefore, the preferred embodiments of the present invention will be explained hereinafter referring to the accompanying drawings.

First Embodiment

Figure 1:
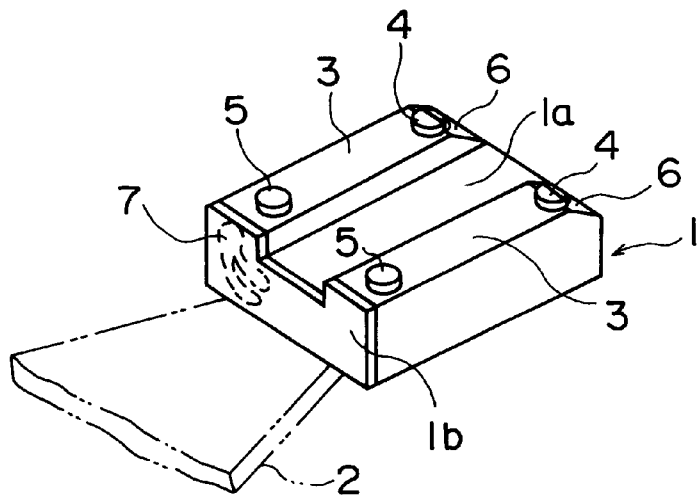
FIG. 1 is a perspective view showing a magnetic head having a slider according to a first embodiment of the present invention.
Figure 2A:
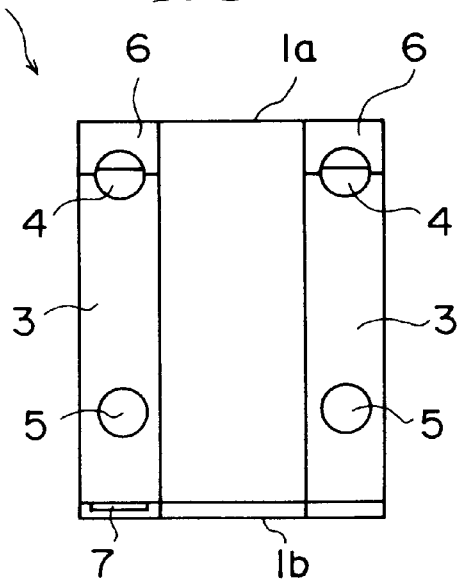
FIG. 2A is a plan view showing the magnetic head having the slider according to the first embodiment of the present invention.
Figure 2B:
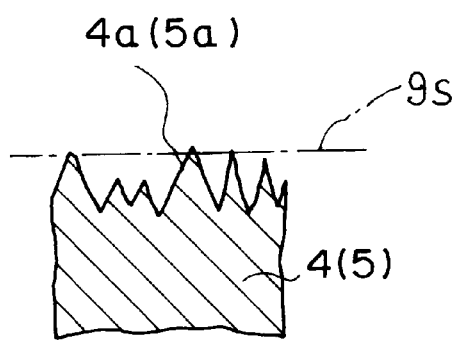
FIG. 2B is a sectional view showing a part of projections formed on the slider in FIG. 2A.

FIG. 1 is a perspective view showing a slider for magnetic head according to a first embodiment of the present invention. FIG. 2A is a bottom view showing the slider for magnetic head in FIG. 1, and FIG. 2B is a sectional view showing a surface state of projections formed on the slider in FIG. 2A.

In FIGS. 1 and 2A, reference 1 denotes a slider for a magnetic head, which is made of $Al_2O_3TiC$ and is secured to a supporting spring (supporting arm) 2 made of load beam or gimbal to be arranged on a magnetic disk (magnetic recording medium).

Two rail surfaces 3 are formed near both sides of a surface of the slider 1 opposing to the magnetic disk (magnetic recording medium). The two rail surfaces 3 are separated by a concave portion 1a. Projections 4, 5 are formed on respective front and rear portions of these rail surfaces 3. The rail surfaces 3 are prevented by the projections 4, 5 from coming into contact with the magnetic disk. Two rail surfaces 3 may serve as kinetic air pressure bearing surfaces.

Inclined surfaces 6 are formed in regions near leading ends (front ends) of the rail surfaces 3. The inclined surfaces 6 readily causes buoyancy by air flow thereon. On an trailing end (trailing end) of the slider 1 is formed an electromagnetic transducer 7 such as magnetoresistive element, spin valve magnetoresistive element, or inductive element.

Heights of the projections 4, 5 are set to about 30 nm so as not to exert an unfavorable influence on a flight of the slider 1.

As shown in FIG. 2B, unevennesses 4a, 5a are formed on surfaces of the projections 4, 5 opposing to the magnetic disk (top surfaces). In order to reduce the contact area between the top surfaces and the surface of the magnetic disk, the average surface roughness (Ra) of the unevennesses 4a, 5a is preferred to be formed larger than that of the magnetic disk surface 9s. In addition, surface roughness of the top surfaces of the projections 4, 5 does not become higher than heights of the projections 4, 5 under all circumstances.

For instance, in the case that average surface roughness of the magnetic disk is 1.0 nm, average surface roughness of the top surfaces of the projections 4, 5 having a height of 30 nm are more than 1.0 nm and less than 30 nm.

When the slider 1 constructed as above is mounted on the magnetic disk, four projections 4, 5 are able to come more firmly into contact with the magnetic disk surface 9s if they have larger diameters, respectively. However, since areas in which the projections 4, 5 having the above average surface roughness come directly into contact with the magnetic disk and these areas are smaller than the areas at the foots of the projections 4, 5, suction force caused between the projections 4, 5 and the magnetic disk cannot be enhanced.

Accordingly, if all projections 4, 5 are placed to be included within a range of the magnetic disk surface 9s wherein the projections 4, 5 are able to surely come into contact with the magnetic disk surfaces 9s, excessive load is in no ways imposed on a part of the projections 4, 5. Therefore, wear-out rate of a part of the projections 4, 5 is not significantly accelerated as compared to the designed wear-out rate, nor is durability degraded.

In FIGS. 1 and 2A, a reference 1b denotes a protection film covering the electromagnetic transducer 7.

Second Embodiment

In a second embodiment, as a configuration of the projection to reduce substantially a contact area between the magnetic disk and surface the projection, a configuration being different from the first embodiment will be explained hereinbelow.

Figure 3A:
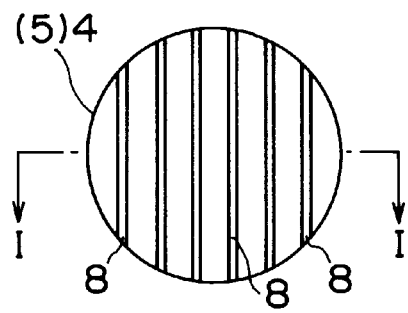
FIG. 3A is a plan view showing projections formed on a slider according to a second embodiment of the present invention.
Figure 3B:
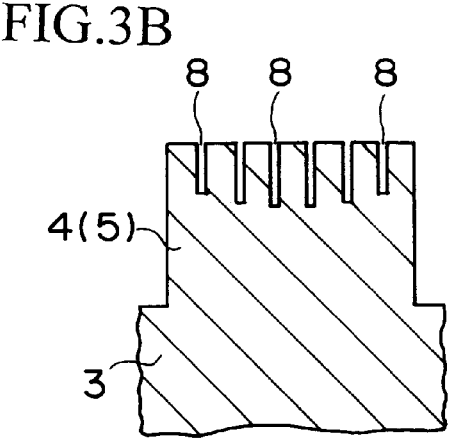
FIG. 3B is a sectional view showing the projections formed on the slider in FIG. 3A.

A configuration shown in FIGS. 3A and 3B may be adopted as the projection on the slider shown in FIG. 1.

In FIGS. 3A and 3B, one or more stripe-like groove 8 extending from leading ends of the slider 1 to trailing ends, as shown in FIG. 3A, are formed on top surfaces of the projections 4, 5. These grooves 8 are formed in the direction substantially perpendicular to the surface 9s of the magnetic recording. In the case that a plurality of grooves 8 are formed, depths of the grooves 8 are not always formed identically. For example, the groove 8 may be formed deeper as they are located closer to the center.

As shown in FIG. 3B, the depths of the grooves 8 are not large, than the absolute values of the heights of the projections 4 (5), but large, than the average surface roughness of the magnetic recording medium. Widths of the groove 8 are formed to be about 1 to 10 μm. For example, planar diameters of the projections 4, 5 are set to 100 μm and widths of the groove 8 are set to 10 μm.

In this case, although the depths of the groove 8 may be set equally to the heights of the projections 4, 5, mechanical strength of the projections 4, 5 is likely to be weakened if the groove 8 are formed too deep. Therefore, it is preferable that the depths of the groove 8 be formed lower than the heights of the projections 4, 5.

In the projections 4, 5 of the slider 1 having the grooves 8 formed as described above, the grooves 8 are formed substantially perpendicularly to the surface 9s of the recording layer 9a of the magnetic disk 9. Therefore, even if, as shown in FIG. 4, wear-out occurs because of friction caused between the projections 4, 5 and the magnetic disk 9, contact areas between the projections 4, 5 and the magnetic disk 9 are hardly changed, and suction force is thus never increased significantly. If the depths are different, sudden increase in suction force can be avoided.

For this reason, since a change amount in suction force caused between such projections 4, 5 and the magnetic disk 9 is suppressed small even if a long time has been spent accumulatedly. Therefore, the magnetic disk 9 and the supporting spring 2 can be operated stably.

Since the contact areas between the projections 4, 5 and the magnetic disk 9 are narrower than the planar areas of the projections 4, 5, suction force caused between the projections 4, 5 and the magnetic disk 9 is reduced.

When a relationship between the number of CSS of the projections 4, 5 and friction force of the projections 4, 5 has been investigated, the friction force is gradually increased with the increase in the number of CSS, as shown in FIG. 5. The reason for this may be because, since sectional shapes of the projections 4, 5 are formed as a trapezoid, top surfaces of the projections 4, 5 are spread slightly due to wear-out of the projections 4, 5.

On the other hand, in the conventional projections in which the groove are not formed on the top surfaces and surface roughness of the top surfaces on the projections are substantially similar to that of the magnetic disk, the friction force of the projections suddenly increases when the number of CSS is increased to some extent. This seems that, under the condition that a part of the projections flies over, loads of the slider and the like applied to remaining projections are increased so that the remaining projections are easy to be eliminated because of wear-out to bring the magnetic disk into contact-with the rail surfaces.

Since the grooves 8 on the top portions of the projections shown in FIGS. 3A and 3B are formed along the tangent line of the magnetic disk, lubricant 9b coated on the surface of the magnetic disk becomes easy to pass through in the grooves 8 to improve rise-up of CSS, as shown in FIG. 4.

Still further, if the depths of the grooves 8 are smaller than the heights of the projections 4, 5, such projections 4, 5 still remain even when the projections 4, 5 are rapidly worn out to thus eliminate the grooves 8. Therefore, the magnetic disk 9 never comes into contact with the rail surfaces.

Depth, width, number, etc. of the grooves 8 may be appropriately changed according to surface roughness of the magnetic disk, film thickness of the lubricant, thrust load, weight of the magnetic head, etc.

Third Embodiment

In a third embodiment, as a configuration to reduce substantially a contact area between the magnetic disk and the projections, a configuration being different from those in the first and second embodiments will be explained.

Figure 6A:
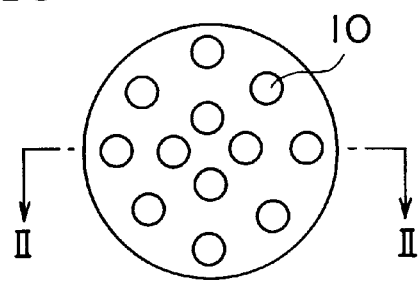
FIG. 6A is a plan view showing projections formed on a slider according to a third embodiment of the present invention.
Figure 6B:
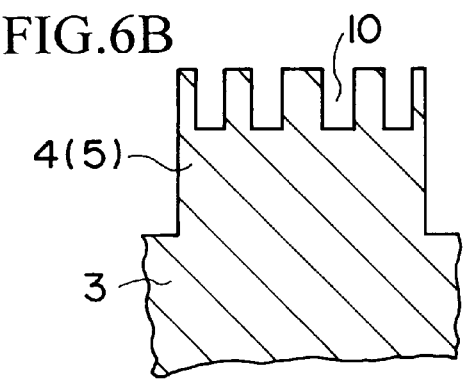
FIG. 6B is a sectional view showing the projections formed on the slider in FIG. 6A.

In the third embodiment, holes 10 shown in FIGS. 6A and 6B are formed on the top surfaces of the projections 4, 5 of the slider shown in FIG. 1.

One hole 10 or a plurality of holes 10 are formed on the top surfaces of the projections 4, 5. These holes 10 are cut out in the direction substantially perpendicular to the surface of the magnetic disk. Depth of the holes 10 is smaller than heights of the projections 4, 5, as shown in FIG. 6B, and is larger than surface roughness of the surface 9s of the magnetic disk. For example, the depth is set to about 10 nm.

In this case, the depth of the holes 10 may be formed identically to the heights of the projections 4, 5. However, if the holes 10 are formed excessively deep, mechanical strength of the projections 4, 5 is likely to be weakened. For this reason, it is preferable that the depth of the holes 10 is formed smaller than the heights of the projections 4, 5.

In addition, if a plurality of holes 10 are to be formed, all depths of the holes 10 are not necessarily formed identically. For instance, the depths may be formed deeper as the holes 10 locate more closely to the center.

Even if wear-out of the projections 4, 5 of the slider 1 having the holes 10 formed as above is caused by friction generated between the projections 4, 5 and the magnetic disk 9, contact areas between the projections 4, 5 and the magnetic disk 9 are not changed since the holes 10 are formed substantially perpendicularly to the surface of the magnetic disk 9. According to such projections 4, 5, even if a cumulative use time is prolonged, little change in suction force generated between the projections 4, 5 and the magnetic disk 9 occurs, thereby causing the magnetic disk 9 and the arm 2 to be operated stably.

Still further, as shown in FIG. 5, the holes 10 formed on the top surfaces of the projections 4, 5 come into contact with lubricant 9b on the magnetic disk 9 and then a part of the lubricant 9b is trapped into the holes 10. Hence, even if a layer of the lubricant 9b is thinned, degradation in wear resistance and durability of the projections 4, 5 can be suppressed because the lubricant 9b is supplemented by the holes 10.

Moreover, since contact areas between the projections 4, 5 and the magnetic disk 9 are made smaller than planar areas of the projections 4, 5, the suction force generated between the projections 4, 5 and the magnetic disk 9 is reduced.

Depth, diameter, number, etc. of the holes 10 may be appropriately changed according to surface roughness of the magnetic disk, film thickness of the lubricant, thrust load, weight of the magnetic head, etc.

Fourth Embodiment

In a fourth embodiment, as a configuration to reduce substantially a contact area between the magnetic disk and the projections, a configuration of the projections being different from those in the above embodiments will be explained.

Figure 7A:
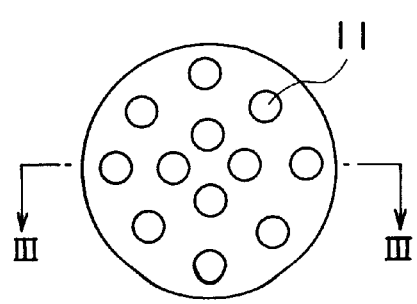
FIG. 7A is a plan view showing projections formed on a slider according to a fourth embodiment of the present invention.
Figure 7B:
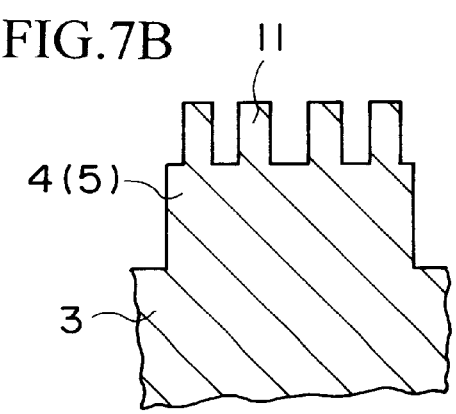
FIG. 7B is a sectional view showing the projections formed on the slider in FIG. 7A.

In the fourth embodiment, second projections 11 shown in FIGS. 7A and 7B are formed on the top surfaces of the projections 4, 5 of the slider shown in FIG. 1.

One or more second projections 11 are formed in terms of photolithography on the top surfaces of the projections 4, 5. Such second projections 11 stand in the direction almost perpendicular to the surface of the magnetic disk 9. The total height of the projections 4, 5 the second projections 11 is designed to be equal to the original height of the projections 4, 5, as shown in FIG. 2B. For example, the total height is set to 20 nm.

Surface roughness of the projections 4, 5 by the second projections 11 becomes larger than surface roughness of the magnetic disk 9.

By way of example, if viewed from the top, diameters of the projections 4, 5 serving as a base are 100 μm and diameters of the second projections 11 are 20 μm.

In addition, if a plurality of second projections 11 are to be formed, all heights of the second projections 11 are not always formed identically. For instance, the heights may be formed higher as the second projections 11 locate more closely to the center.

Even when wear-out of the projections 4, 5 having the second projections 11 formed described as above is caused by friction generated between the projections 4, 5 and the magnetic disk 9, contact areas between the projections 4, 5 and the magnetic disk 9 are not significantly changed since the second projections 11 are formed substantially perpendicularly to the surface of the magnetic disk. According to such second projections 11, even if a cumulative use time is expanded, little change in suction force generated between the projections 4, 5 and the magnetic disk 9 occurs so that the magnetic disk 9 and the supporting spring 2 can be operated stably.

Moreover, since contact areas between the projections 4, 5 and the magnetic disk 9 are made smaller than planar areas of the projections 4, 5, the suction force generated between the projections 4, 5 and the magnetic disk 9 is reduced.

The depth, diameter, number, etc. of the second projections 11 may be appropriately changed according to surface roughness of the magnetic disk, film thickness of the lubricant, thrust load, weight of the magnetic head, etc.

Fifth Embodiment

Figure 8A:
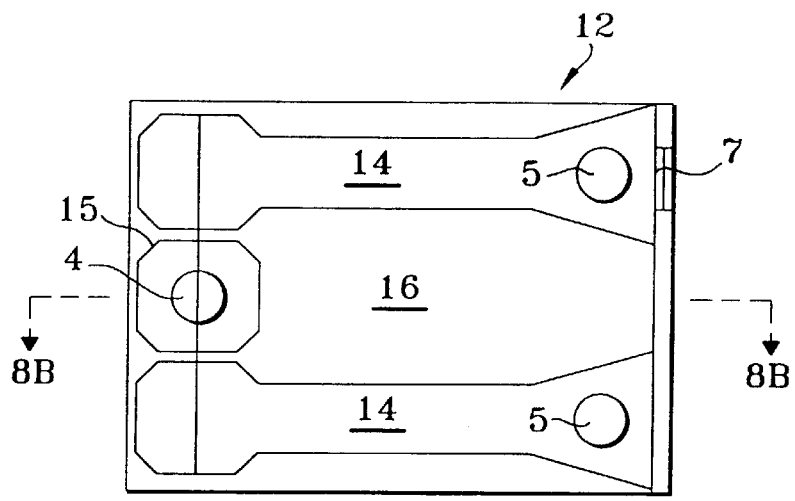
FIG. 8A is a plan view showing a magnetic head having a slider according to a fifth embodiment of the present invention.
Figure 8B:
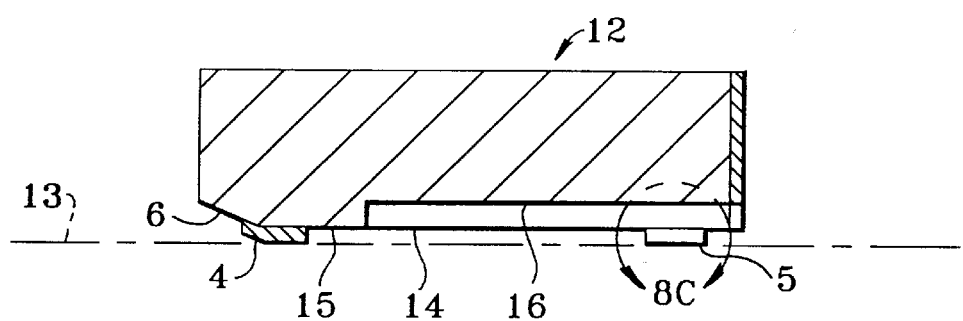
FIG. 8B is a sectional view showing the slider in FIG. 8A along line 8B–8B.

The projections 4, 5 and their profiles shown in the above first to fourth embodiments can be applied to not only the slider for the magnetic head shown in FIG. 1 but also a negative pressure type slider having a configuration in which a projection is formed on the leading end side and two projections are formed on the trailing end side, as shown in FIGS. 8A and 8B.

Figure 8C:
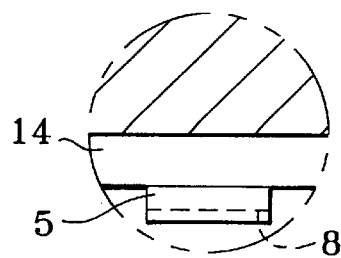
FIG. 8C is an enlarged view of area 8C of FIG. 8B.

Such slider will be explained with reference to FIGS. 8A, 8B and 8C. In FIGS. 8A, 8B and 8C, like references in FIG. 1 identify like elements.

A slider 12 shown in FIGS. 8A and 8B is made of Al$_2$O$_3$TiC, and has a rectangular planar shape of 1.25 mm×1 mm. Rail surfaces 14 each having an almost stripe-like shape are formed near both sides on the surface of the slider 12 opposing to the magnetic disk 13 to extend in the lateral direction. An island-like rail surface 15 is formed on the leading end side of a concave portion 16 between the rail surfaces 14. Narrowest portions of the rail surfaces 14 having the almost stripe-like shapes are formed to have a width of about 100 μm.

A front projection 4 is formed on the island-like rail surface 15. Rear projections 5 are formed in an area of one of the rail surfaces 14 having the almost stripe-like shapes near the trailing end. As a result, straight lines connecting three projections 4, 5 form a triangle. Three projections 4, 5 can be formed by the same steps described above.

In the slider 12, when such projections having the configurations as explained in the fifth to fourth embodiments are adopted, a part of three projections 4, 5 can be prevented from flying over the magnetic disk 13 if the slider 12 is mounted on the magnetic disk 13.

Accordingly, such deviation of load in no means occurs that a part of front and rear projections 4, 5 are eliminated due to wear-out. Since the configuration including groove 8, holes 10, or second projections 11 are applied to contacting portions of these projections 4, 5 with the magnetic disk 13, extreme increase in contact area between the projections 4, 5 and the magnetic disk 13 can be avoided by increasing the number of the groove 8 or the holes 10, otherwise decreasing the number of the second projections 11 even in the case that widths of the projections 4, 5 are widened. Therefore, suction force between the projections 4, 5 and the magnetic disk 13 is not increased.

The concave portion 16 surrounded by the rail surfaces 14, 15 serves as a negative pressure region.

Sixth Embodiment

Steps for manufacturing the groove, the holes, or the second projections described above will be explained hereinbelow.

Figure 9A:
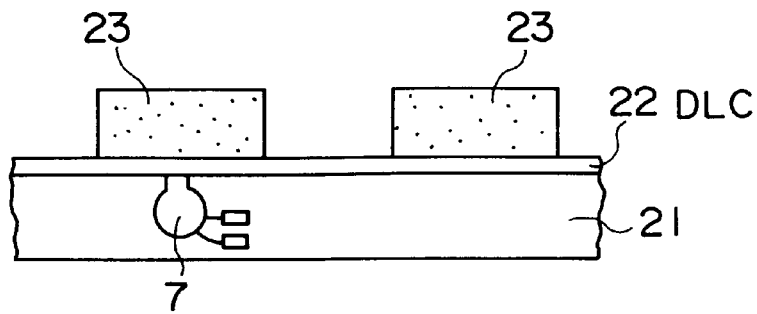
FIGS. 9A to 9D are sectional views showing steps for forming a slider according to a sixth embodiment of the present invention.

To begin with, as shown in FIG. 9A, a plurality of electromagnetic transducers 7 are formed on a substrate 21, and then a plurality of stick-like substrates are formed by dividing the substrate 21. After this, a diamond-like carbon (abbreviated to a "DLC" hereinafter) film 22 is formed on the surface of the stick-like substrates 21 opposing to the magnetic disk so as to have a thickness of 30 nm. As material for the substrate 21, ferrite, calcium titanate, etc. may be used in addition to Al$_2$O$_3$TiC discussed in the above embodiments.

Si or SiC may be interposed between the DLC film 22 and the substrate 21 to improve adhesiveness.

Subsequently, a first photoresist 23 is coated on the DLC film 22 in a state that the electromagnetic transducer 7 is turned sideways, and then exposed and developed. As a result, stripe patterns are formed to overlap with the rail surface area on the substrate 21.

Figure 9B:
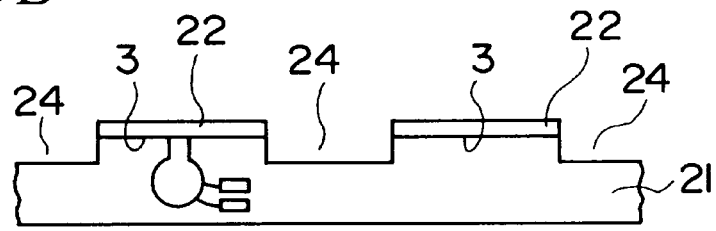

Next, by making the use of patterns of the first photoresist 23 as a mask, the DLC film 22 is etched by oxygen plasma. In turn, the substrate 21 is etched by ion milling to form the concave portions 24. Thereby, the concave portions 24 exist around the stripe-like rail surfaces 3. By removing the first photoresist 23 by solvent, a resultant structure has a sectional shape as shown in FIG. 9B.

Figure 9C:
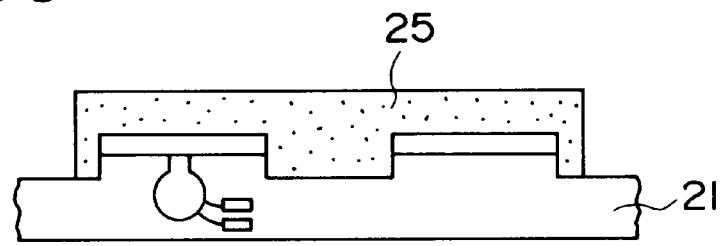
Figure 9D:
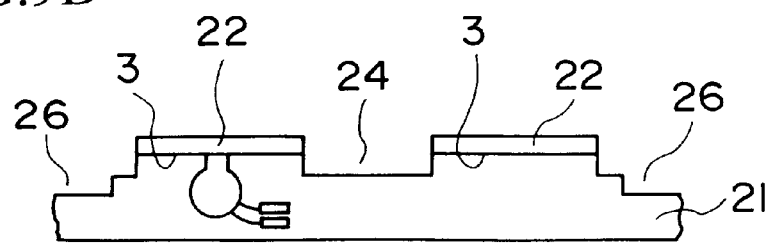

Next, in order to form cut-off portions of the stick-like substrate 21 as thin layer, as shown in FIG. 9C, slider forming areas are covered with a second photoresist 25. In addition, the substrate 21 is thinned by ion milling using the second photoresist 25 as a mask, and then, as shown in FIG.

9D, cut-off grooves 26 are formed on the boundary areas between the slider forming areas.

Figure 10A:
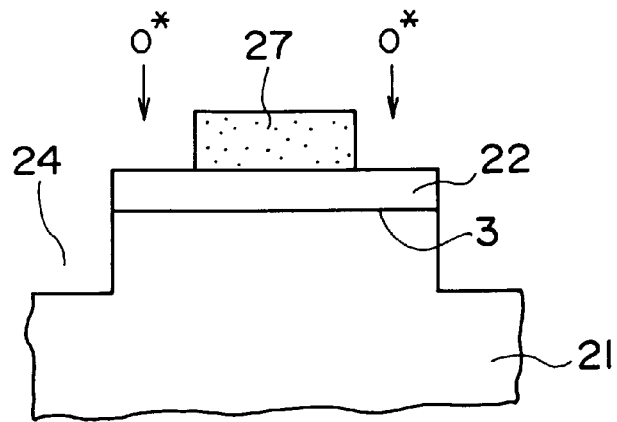
FIGS. 10A to 10C are sectional views showing steps for forming the slider according to the sixth embodiment of the present invention.

After the removal of the second photoresist 25, as shown in FIG. 10A, projection forming areas of the DLC film 22 formed on the rail surfaces 3 are covered with a third photoresist 27, and then the DLC film 22 is etched by oxygen etching using the third photoresist 27 as a mask. Thus remaining DLC films 22 beneath the third photoresist 27 may be used as projections 4 (5).

Figure 10B:
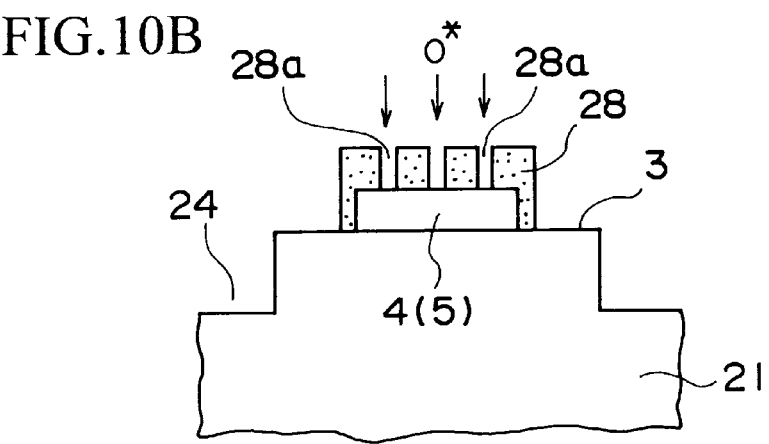
Figure 10C:
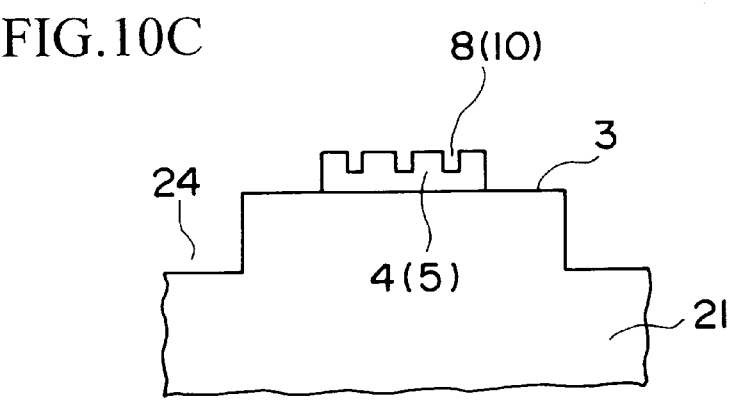

In turn, after removal of the third photoresist 27, a fourth photoresist 28 is coated. By exposing and developing the fourth photoresist 28, as shown in FIG. 10B, windows 28a are formed on at least projections 4 (5). Subsequently, as shown in FIG. 10C, upper portions of the projections 4 (5) exposed from the windows 28a are etched by using oxygen plasma.

In case planar profiles of the windows 28a are formed as stripe shapes, the grooves 8 as shown in FIG. 3 are formed on upper portions of the projections 4 (5). Further, in case planar profiles of the windows 28a are formed as dots, the holes 10 as shown in FIG. 6 are formed. Furthermore, in case planar profiles of the fourth photoresist 28 on the projections 4 (5) are formed as dots, the second projections 11 as shown in FIG. 7 are formed.

Seventh Embodiment

Figure 11A:
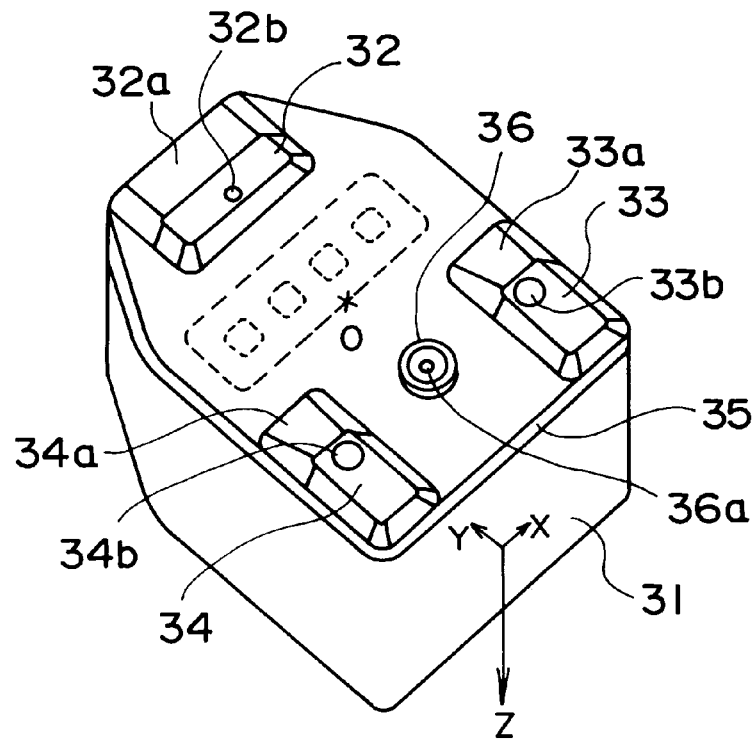
FIG. 11A is a perspective view showing a magnetic head according to a first example of a seventh embodiment of the present invention.
Figure 11B:
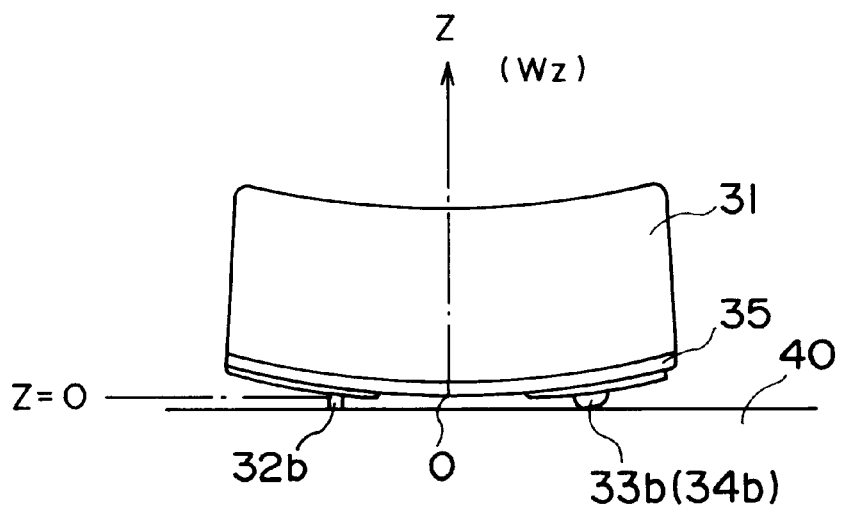
FIG. 11B is a sectional view showing a curved side portion of the magnetic head with slight exaggeration.

FIG. 11A is a perspective view showing a head slider according to the first example of the seventh embodiment of the present invention. FIG. 11B is a sectional view showing a curved side portion of the head slider with slight exaggeration.

In FIG. 11A, on the surface of the slider main body 31 made of nickel and opposing to the magnetic disk 40 (referred to as a magnetic disk opposing surface or a magnetic recording medium opposing surface hereinafter) a non-magnetic insulating layer 35 is formed which has rail surfaces 32, 33, and 34 thereon. An electrostatic actuator 36 is buried in an area near the rear end of the magnetic disk opposing surface.

On the inside of the electrostatic actuator 36, an electromagnetic transducer 36a is attached movably in the in-plane direction of the magnetic disk opposing surface and in the vertical direction. A movable amount of the electromagnetic transducer 36a may be adjusted by the electrostatic actuator 36. As a result, the tracking location and the flying height of the electromagnetic transducer 36a or thrust force to the electromagnetic transducer 36a against the surface of the magnetic recording medium can be controlled.

As shown in FIG. 11B, the non-magnetic insulating layer 35 of the slider is curved slightly and a crowning amount is set to about 10 nm to 1 μm.

Figure 12:
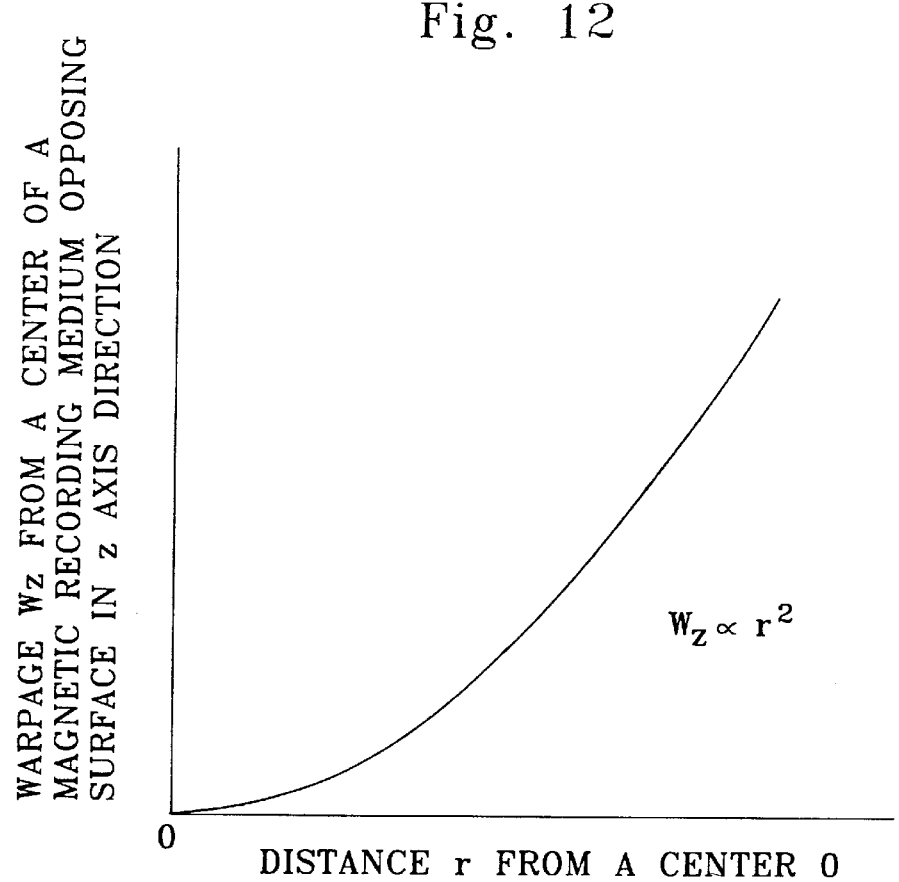
FIG. 12 is a characteristic diagram illustrating a degree of curvature of a surface of the magnetic head opposing to a magnetic recording medium.

Warpage profile of the non-magnetic insulating layer 35 of the slider is shown in FIG. 12. In other words, the curvature varies substantially directly as square of the distance from the center O of the magnetic disk opposing surface. In FIG. 12, the ordinate denotes a relationship between a distance r from the center O of the non-magnetic insulating layer 35 in the xy surface and a distance from the center O in the z direction where the direction perpendicular to the magnetic disk opposing surface at the center O of is set as the z direction.

The rail surfaces 32, 33, and 34 on the non-magnetic insulating layer 35 are provided at three locations. The first rail surface 32 is formed near the leading end of the slider, while the second and the third rail surfaces 33 and 34 are formed near the trailing end of the slider. Tapered surfaces 32a, 33a, and 34a are formed at least on the leading ends of the first, second, and third rail surfaces 32, 33, and 34 so as to cause the slider to easily fly over the magnetic disk.

Projections 32b, 33b, and 34b are provided on the first, second, and third rail surfaces 32, 33, and 34. The projections are made of $SiO_2$, DLC, or the like.

Central points of the first, second, and third projections 32b, 33b, and 34b are located near the center O of the non-magnetic insulating layer 35 rather than a point which is located at ½ lengths in the x axis direction and ½ lengths in the y axis direction of the first, second, and third rail surfaces 32, 33, and 34. Where "center O of the non-magnetic insulating layer 35" means a point given by a line passing through a center of gravity of the slider main body 31 if the line is drawn, into the inside of the slider main body 31 or the inside of the non-magnetic insulating layer 35 in the vertical direction.

In the seventh embodiment, x axis direction, y axis direction, and z axis direction are set orthogonally to each other. Taking account of the flying height 0.05 to 0.1 μm of the magnetic head, heights of the first, second, and third projections 32b, 33b, and 34b are determined at about 20 to 30 nm. Still further, as shown in FIG. 11B, in the first, second, and third projections 32b, 33b, and 34b, respective vertices are formed so as to protrude toward the magnetic disk 40 in contrast to the center O of the non-magnetic insulating layer 35 in the magnetic disk opposing surface.

All the first, second, and third rail surfaces 32, 33, 34, and the first, second, and third projections 32b, 33b, 34b, and the non-magnetic insulating layer 35 may be covered with a DLC film (not shown).

With the slider for magnetic head as mentioned above, since the first, second, and third projections 32b, 33b, and 34b are provided at the locations near the center of the surface opposing to the magnetic recording medium 40, such projections can firmly come into contact with the CSS region of the magnetic disk 40 and other portions of the slider cannot come into contact with the disk 40.

Besides, since the slider is supported by the first to third projections at three points so as to surround the central point O of the surface opposing to the magnetic recording medium 40, it is stable in mechanics.

In particular, in the slider wherein the flying height of the electromagnetic transducer 36a shown in FIG. 11A or the thrust force to the electromagnetic transducer against the recording disk is controlled by means of the electrostatic actuator 36, the flying height of the rail portions which does not contribute directly to electromagnetic exchange can be higher compared to the conventional sliders, which gives better tribological reliability.

Accordingly, if, under the condition that the slider for magnetic head is being filed, an allowable value of flatness of the rail surfaces 32 to 34 is relaxed up to the range where the rail surfaces 32 to 34 do not come directly into contact with the magnetic disk 40, a crowning amount of the slider may be increased up to about 1 μm. Further, if the first, second, and third projections 32b, 33b, 34b are provided, the rail surfaces do not come into contact with the magnetic recording medium according to relaxation of the allowable value of flatness.

Next, a method of manufacturing the slider for magnetic head stated above will be explained in brief.

Figure 13A:
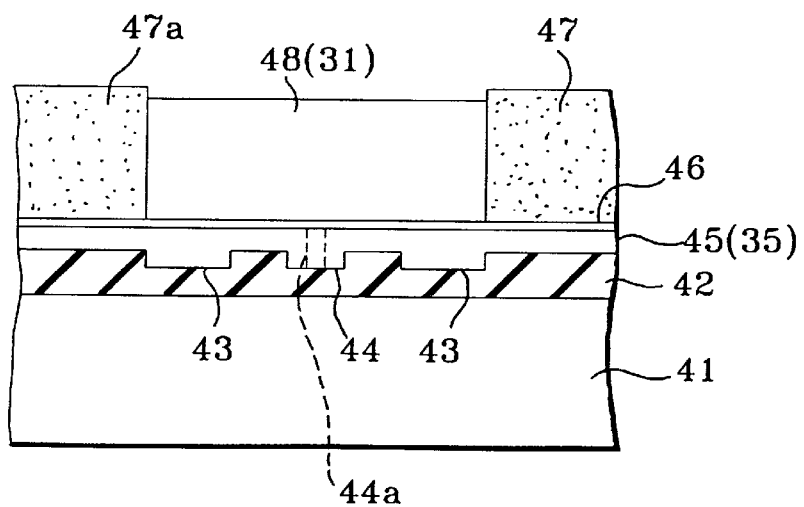
FIGS. 13A and 13B are sectional views showing manufacturing steps of the magnetic head according to the first example of the seventh embodiment of the present invention.

First, as shown in FIG. 13A, an aluminum film 42 is formed on a substrate 41, then first concave portions 43 are formed at projection forming locations by patterning the aluminum film 42 by means of photolithography, and then a second concave portion 44 is formed at an electrostatic actuator attaching location. Then, an SiO₂ film 45 acting as a non-magnetic insulating layer 35 opposing to the magnetic disk 40 is formed on the aluminum film 42 by sputtering. Then, a hole 44a to expose the moving portion of an electrostatic actuator from the medium opposing surface is formed in the SiO₂ film 45.

Still further, after a plating electrode-pattern layer 46 is formed on the SiO₂ film 45, a photoresist pattern 47 having an opening 47a in the slider forming region is formed on the electrode-pattern layer 46. Next, a nickel film 48 constituting the slider main body 1 and the electrostatic actuator is formed in the opening 47a in the photoresist pattern 47 by electrolytic plating.

Thereafter, the electrode-pattern layer 46 and the SiO₂ film 45 are removed in the portions which are not covered with the nickel film 48 by etching after removing the resist pattern 47 in solvent, and then the substrate 41 and the SiO₂ film 45 are separated by removing the aluminum film 42 by etching in KOH solution.

The SiO₂ film 46 in the first concave portion 43 is used as the rail surfaces 32 to 34 shown in FIG. 11. The projections 32b, 33b, and 34b are then formed by patterning the DLC film formed on the rail surfaces.

Figure 13B:
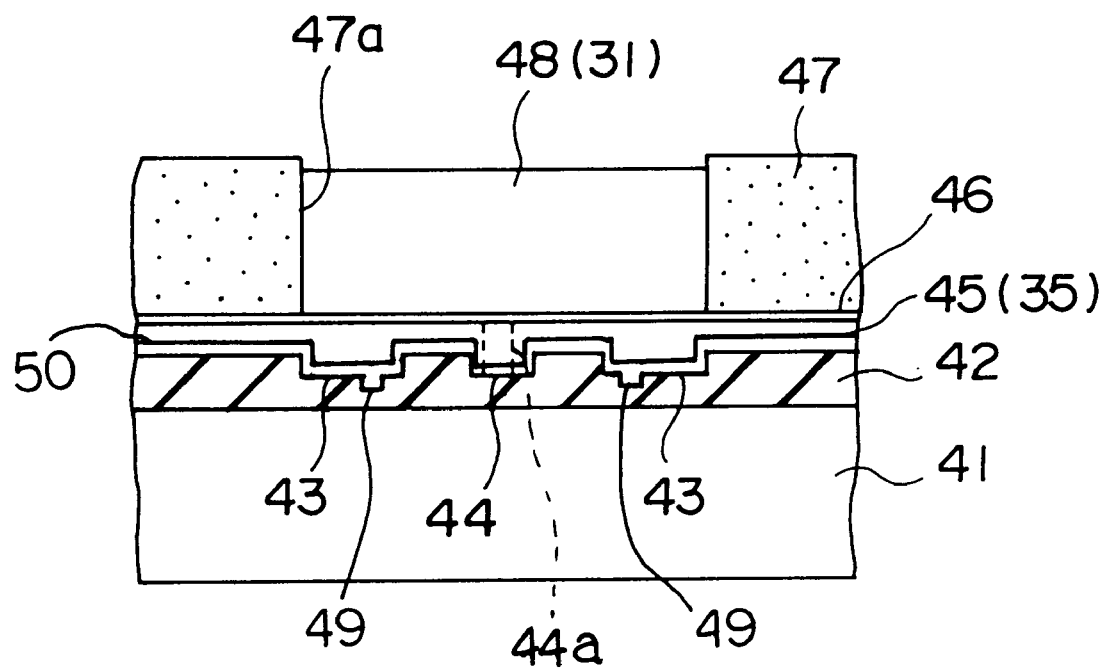

Besides, as shown in FIG. 13B, after a third concave portion 49 in a part of each the first concave portion 43, a DLC film 50 is formed on the aluminum film 42 and in the first, second and third concave portions 43, 44 and 49. therefore, the DLC film 50 in the third concave portion 49 is projected to the substrate 41 from a surface of the first concave portion 43, and a part of the DLC film 50 in the third concave portion 49 is using as the projection 32b, 33b or 34b, as shown in FIG. 11. Above the SiO₂ film 45 is formed on the DLC film 50.

Consequently, the slider for magnetic head shown in FIG. 11 has been finished.

Figure 14:
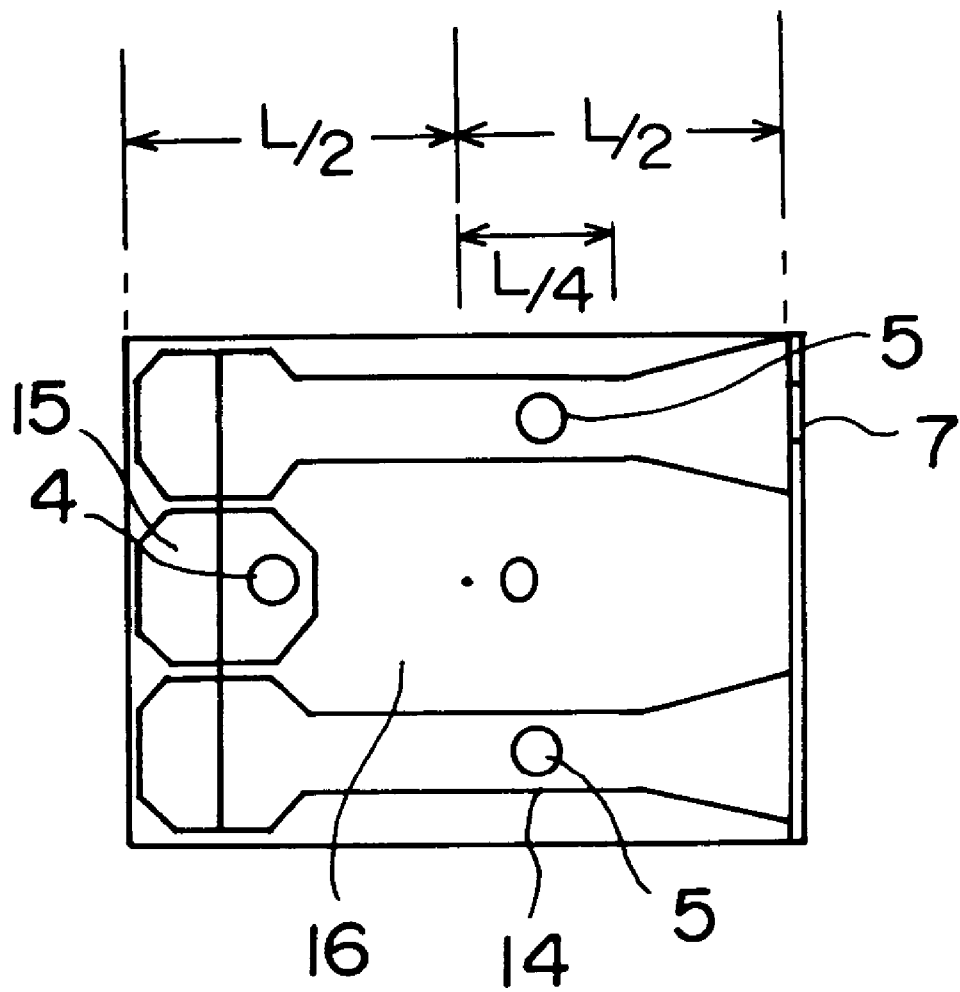
FIG. 14 is a plan view showing a magnetic head according to a second example of the seventh embodiment of the present invention.
Figure 14:
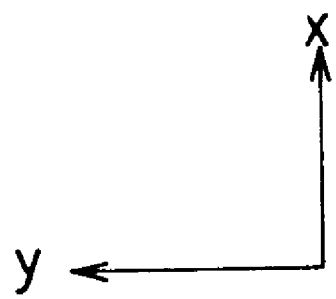

Subsequently, the case will be explained with reference to FIG. 14 where the slider for magnetic head shown in FIG. 14 is curved to produce a crown.

In the magnetic head shown in FIG. 14, like references in FIG. 8 refer to like elements. Assuming that a length along the direction (y direction) from the leading end (front end) of the magnetic head to the trailing end (rear end) is L.

The projections 5 formed on the first and second rail surfaces 14 of the magnetic head are formed in the range spanning from the center of the length of the magnetic head in the y direction to the location retreated toward the rear end by L/4. The projection 4 formed on the rail surface 15 is also formed on the right side (slider center side) rather than the center of the rail surface 15. Therefore, even if the crowning amount such as about 300 nm occurs on the magnetic disk opposing surface of the magnetic head, the projections 4, 5 can be brought firmly into contact with the magnetic disk.

Additional advantages and modifications will readily occur to those skilled in the art. Therefore, the present invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A slider for a magnetic head comprising:
   a main body fitted into a supporting arm;
   at least two rail surfaces formed on said main body to serve as pneumatic bearings; and
   at least one projection formed on said rail surfaces, a surface of said projection opposing a magnetic recording medium having a larger surface roughness than that of said magnetic recording medium, said surface roughness being adapted to reduce surface contact between said projection and said magnetic recording medium.

2. A slider for a magnetic head according to claim 1, wherein heights of said surface roughness is not higher than a height of said projection.

3. A slider for a magnetic head according to claim 2, wherein said heights of said surface roughness are uneven.

4. A slider for a magnetic head comprising:
   a main body fitted into a supporting arm;
   at least two rail surfaces formed on said main body to serve as pneumatic bearings; and
   a plurality of first projections formed on said rail surfaces, said first projections having surfaces, and each of said surfaces having an unevenness which is larger than a surface roughness of a magnetic recording medium opposing said surfaces of said first projections, said unevenness being adapted to reduce surface contact between said projections and said magnetic recording medium.

5. A slider for a magnetic head according to claim 4, wherein said first projections are formed near leading ends and trailing ends of said two rail surfaces which are formed near both sides of said main body.

6. A slider for a magnetic head according to claim 4, wherein at least one of said first projections is formed at least near a leading end of said main body.

7. A slider for a magnetic head according to claim 4, wherein said unevenness of said first projections consist of one of a plurality of grooves formed on said surfaces of said first projections opposing said magnetic recording medium, a plurality of holes formed on said surfaces opposing said magnetic recording medium, and a plurality of second projections formed on said surfaces opposing said magnetic recording medium.

8. A slider for a magnetic head according to claim 4, wherein said unevennesses of said first projections are unequal in their heights.

9. A slider for a magnetic head according to claim 8, wherein said first projections are formed near leading ends and trailing ends of said two rail surfaces which are formed near both sides of said main body.

10. A slider for a magnetic head according to claim 8, wherein at least one of said first projections is formed at least near an leading end of said main body.

11. A slider for a magnetic head according to claim 8, wherein said unevenness of said first projections consist of one of a plurality of grooves formed on said surfaces of said first projections opposing said magnetic recording medium, a plurality of holes formed on said surfaces opposing said magnetic recording medium, and a plurality of second projections formed on said surfaces opposing said magnetic recording medium.

12. A slider for a magnetic head according to claim 4, wherein said first projections are formed with a material which is different from that of said main body.

13. A slider for a magnetic head according to claim 12, wherein said first projections are formed near leading ends and trailing ends of said two rail surfaces which are formed near both sides of said main body.

14. A slider for a magnetic head according to claim 12, wherein at least one of said first projections is formed at least near a leading end of said main body.

15. A slider for a magnetic head according to claim 12, wherein said unevenness of said first projections consist of one of a plurality of grooves formed on said surfaces opposing said magnetic recording medium, a plurality of holes formed on said surfaces opposing said magnetic recording medium, and a plurality of second projections formed on said surfaces opposing said magnetic recording medium.

16. A slider for a magnetic head comprising:
  a main body having a surface which is one of flat and slightly curved toward the outside of said main body and opposing a magnetic recording medium;
  rail surfaces formed at a plurality of locations on said main body to serve as pneumatic bearings; and
  a projection formed on each of said rail surfaces in areas near a center of gravity of said main body opposing said magnetic recording medium rather than centers of respective said rail surfaces.

17. A slider for a magnetic head according to claim 16, wherein said rail main body surfaces are formed around a center of said surface opposing said magnetic recording medium.

18. A slider for a magnetic head according to claim 16, wherein a region wherein an electromagnetic transducer is attached is provided on said main body surface opposing said magnetic recording medium.

19. A magnetic memory apparatus comprising:
  (a) slider for a magnetic head comprising
    (1) a main body fitted into a supporting arm,
      at least two rail surfaces formed in said main body to serve as pneumatic bearings, and
    (2) at least one projection formed on said rail surfaces, a surface of said projection opposing a magnetic recording medium having a larger surface roughness than that of said magnetic recording medium, said surface roughness being adapted to reduce surface contact between said projection and said magnetic recording medium;
  (b) an electromagnetic transducer formed on said slider; and
  (c) said magnetic recording medium being arranged so as to oppose said electromagnetic transducer.

20. A magnetic memory apparatus comprising:
  (a) a slider for a magnetic head comprising
    (1) a main body fitted into a supporting arm,
    (2) at least two rail surfaces formed on said main body to serve as pneumatic bearings, and
    (3) a plurality of first projections formed on said rail surfaces, said first projections having surfaces, and each of said surfaces having an unevenness which is larger than a surface roughness of a magnetic recording medium opposing said surfaces of said first projections, said unevenness being adapted to reduce surface contact between said projections and said magnetic recording medium;
  (b) an electromagnetic transducer formed on said slider; and
  (c) said magnetic recording medium being arranged so as to oppose said electromagnetic transducer.

21. A magnetic memory apparatus comprising:
  (a) a slider for a magnetic head comprising
    (1) a main body having a surface which is one of flat and slightly curved toward the outside of said main body and opposing a magnetic recording medium,
    (2) a plurality of rail surfaces formed at a plurality of locations on said main body to serve as pneumatic bearings, and
    (3) a projection formed on each of said rail surfaces in areas near a center of gravity of said main body opposing said magnetic recording medium rather than centers of respective said rail surfaces;
  (b) an electromagnetic transducer formed on said slider; and
  (c) said magnetic recording medium being arranged so as to oppose said electromagnetic transducer.

* * * * *

UNITED STATES PATENT AND TRADEMARK OFFICE
CERTIFICATE OF CORRECTION

PATENT NO. : 5,991,118  
DATED : November 23, 1999  
INVENTOR(S) : Kasamatsu et al.

Page 1 of 1

It is certified that error appears in the above-identified patent and that said Letters Patent is hereby corrected as shown below:

<u>Column 12,</u>
Line 54, delete "an" and insert -- a -- therefor.

Signed and Sealed this

Twenty-first Day of August, 2001

*Attest:*

NICHOLAS P. GODICI
*Acting Director of the United States Patent and Trademark Office*

*Attesting Officer*